United States Patent [19]

Ackermann

[11] 4,074,345

[45] Feb. 14, 1978

[54] ELECTRONIC POWER SUPPLY

[76] Inventor: Walter J. Ackermann, No. 6 Lounsbury Ave., Norwalk, Conn. 06851

[21] Appl. No.: 738,187

[22] Filed: Nov. 2, 1976

[51] Int. Cl.$^2$ .............................................. H02M 1/14
[52] U.S. Cl. ........................................ 363/48; 363/88; 363/136; 363/81
[58] Field of Search ...................... 321/10, 16, 18, 19, 321/47; 323/49; 363/39, 44, 45, 46, 48, 47, 85, 88, 135, 136, 81

[56] References Cited

U.S. PATENT DOCUMENTS

| | | | |
|---|---|---|---|
| 529,152 | 11/1894 | Zickermann | 323/49 |
| 3,218,540 | 11/1965 | Jackson | 321/18 |
| 3,320,512 | 5/1967 | Kruger | 321/19 X |
| 3,437,905 | 4/1969 | Healey et al. | 321/19 |
| 3,480,852 | 11/1969 | Hung | 321/19 |

Primary Examiner—William M. Shoop
Attorney, Agent, or Firm—Robert D. Farkas

[57] ABSTRACT

An electronic power supply utilizes a full wave bridge rectifier circuit whose alternating current voltage source is derived from a multi-primary and multi-secondary winding transformer whose windings are selectively disposed in series or parallel circuits, thereby enabling the apparatus to be effectively employed on a wide variety of A.C. voltage sources. Two adjacent legs of the bridge rectifier employ S.C.R.'s gated simultaneously symetrically by pulses obtained from a unijunction transistor driven by the output of an operational amplifier whose input terminals are coupled to voltage and current sensing networks located at the output terminals of a filter coupled to the D.C. side of the full wave bridge.

2 Claims, 1 Drawing Figure

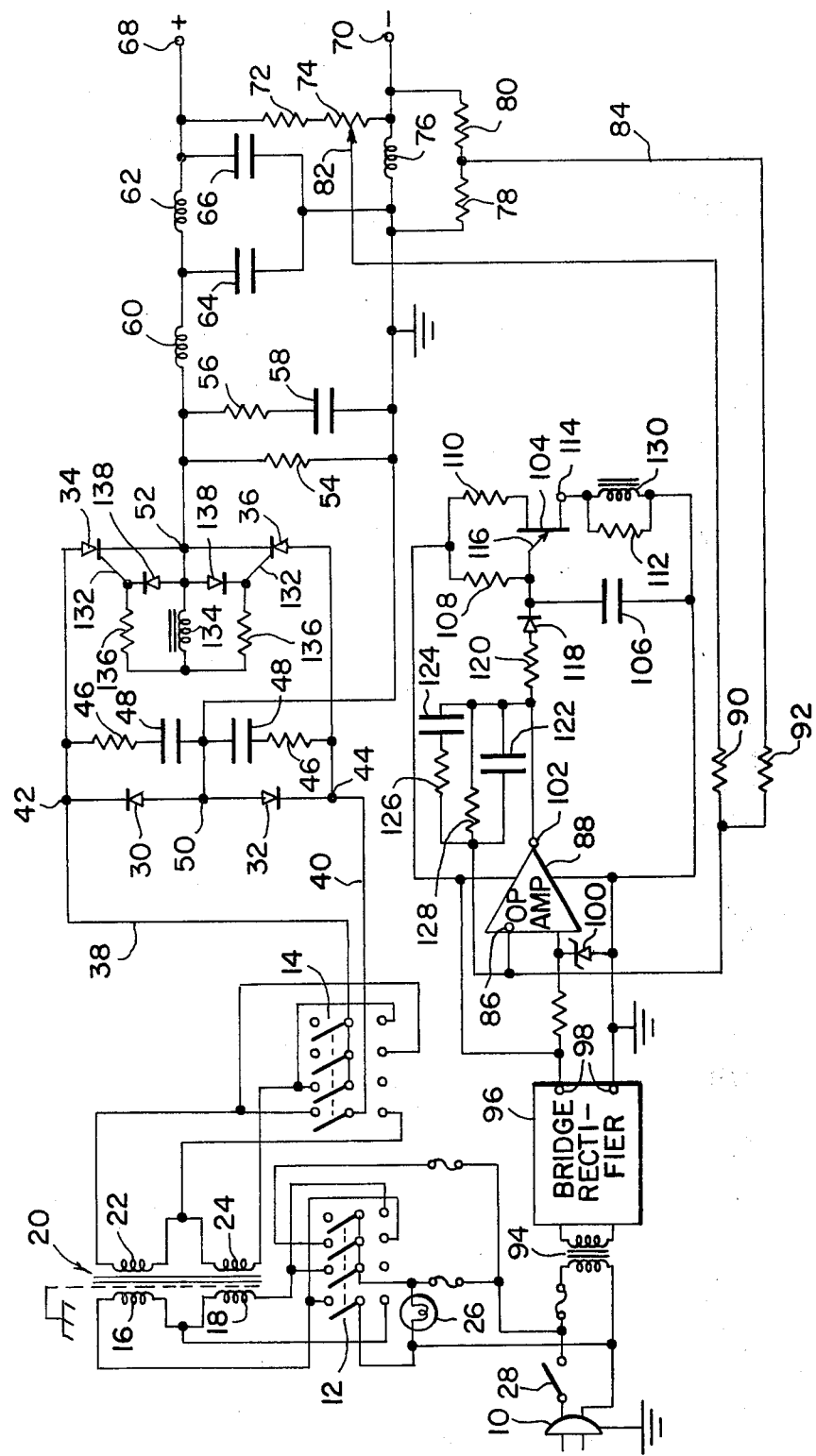

ELECTRONIC POWER SUPPLY

BACKGROUND OF THE INVENTION

THE FIELD OF THE INVENTION

This invention relates to voltage regulating circuits and more particularly to that class designed to operate from various magnitudes of A.C. voltage supply cources.

DESCRIPTION OF THE PRIOR ART

The prior art abounds with a wide variety of regulated power supplies. Typical of these are the disclosures in U.S. Pat. No. 3,742,242, issued on June 26, 1973 to M. Morio et al and U.S. Pat. No. 3,569,818 issued on Mar. 9, 1971 to R. J. Dahlinger et al. Both of the aforementioned patents dislose multi-voltage regulated D.C. generating devices, deriving their driving power source from an unregulated voltage source. The range of maximum deviation of the driving voltage source which may be effectively handles by the disclosed apparatus is limited by the inherent design characteristics of the feedback network utilized therein.

SUMMARY OF THE INVENTION

A primary object of the present invention is to provide a regulated power supply capable of operating from A.C. mains over a wide range of voltage.

Another object of the present invention is to provide a regulator circuit utilizing a minimum of component parts.

Still another object of the present invention is to provide a regulator with a full wave bridge rectifier circuit, thereby minimizing the ripple level.

Yet another object of the present invention is to provide a voltage regulator whose output voltage may be varied in accordance with a manual adjustment of a potentiometer.

A further object of the present invention is to provide a voltage regulator which automatically detects current or voltage variations occurring at the output terminals due to load variations which automatically adjusts therefor.

A still further object of the present invention is to provide a power supply which can produce a wide range of output currents and voltages utilizing a unitary regulator circuit for all ranges of use.

Heretofore, regulated power supplies provided an output voltage which were selected to be within a wide range of voltages, utilizing A.C. mains or an unregulated D.C. source whose voltage variations were necessarily limited. The regulating circuit involved in the feedback network and the characteristics of the rectifier devices limited the ability of such apparats to function over a wide range of input power sources. The present invention eliminates these problems by utilizing a rectifier device which can be controlled effectively over a wide range of applied voltages, capable of producing a wide range of direct currents. Additionally, the present invention utilizes a feedback circuit, compatible with the aforementioned rectifying devices, which is substantially insensitive to the magnitude of the voltage available from the power source.

These objects as well as other objects of the present invention will become more readily apparent after reading the following description of the accompanying drawings.

BRIEF DESCRIPTION OF THE DRAWING

The FIGURE is a schematic representation of the electrical components of the preferred embodiment of the present invention.

DESCRIPTION OF THE PREFERRED EMBODIMENT

The structure and method of fabrication of the present invention is applicable to a dual primary winding and a dual secondary winding transformer. Both primary windings may be connected either in series or in parallel utilizing a primary selective switch. The circuit comprising the primary windings is connected to a source of alternating current acting as power mains for the apparatus. Another switch, independently operable from the primary control switch, places the secondary windings in either a series or a parallel circuit, utilized to provide voltage to a full wave bridge solid state rectifier circuit. A pair of adjacent legs of the rectifier circuit employs S.C.R.'s, back to back. The gates of the S.C.R.'s are symetrically coupled to the secondary of a pulse transformer. The conduction angle of the S.C.R.'s is controlled by the appearance of a pulse of voltage at the secondary of the pulse transformer. The output terminals of the rectifier circuit feed a filter circuit utilizing an inductance input filter, followed by a Pi filter having series inductive elements and shunt capacitive elements in series and in parallel with the output terminals of the present invention. A potentiometer, forming a voltage dividing network circuit, is disposed across the output terminals of the invention. A pair of resistors, disposed in a series circuit, is connected in parallel with an inductive element in series with the output terminals of the present invention, and an output terminal of the bridge rectifier. The wiper arm contact of the potentiometer and the juncture of the pair of resistors are connected to the input terminals of an operational amplifier. The output terminals of the operational amplifier are coupled to a uni-junction transistor disposed in a relaxation oscillator circuit. The primary of the pulse transformer is disposed installed in series with the output terminals of the uni-junction transistor. Thus, voltage and current variations experienced at the output terminals of the apparatus are fed back to the operational amplifier controlling the rate at which voltage pulses appear at the gates of the S.C.R.'s, thereby effectively regulating the direct current output of the present invention over a wide range of load induced variations.

Now referring to the FIGURE showing plug 10 adapted to be electrically coupled to a source of alternating voltage whose magnitude is compensated for by the operation of switch 12 and switch 14. Switch 12 controls primary windings 16 and 18 of transformer 20, disposing them in a series or parallel circuit. Secondary windings 22 and 24 may also be disposed in either a series or a parallel circuit by the selective positioning of switch 14. Lamp 26 and transformer 20 are energized when main on-off switch 28 is closed.

A bridge rectifier, comprising diodes 30 and 32, and S.C.R.'s 34 and 36 are provided with alternating voltage by way of wires 38 and 40 at input terminals 42 and 44. Resistors 46 and capacitors 48 serve to suppress spurious spikes of voltage appearing in the bridge rectifier circuit, due to transients generated by S.C.R.'s 34 and 36.

Output terminals 50 and 52 are connected to fixed load resistor 54 and a high frequency attenuating network including resistor 56 and capacitor 58. Series inductors 60 and 62, in conjunction with shunt capacitors 64 and 66, filter out ripple components appearing at terminals 50 and 52 from output terminals 68 and 70.

Fixed value resistor 72 and potentiometer 74 are shown connected in a series voltage dividing circuit across output terminals 68 and 70. Series inductance 76, disposed between input terminal 50 and output terminal 70, is shown having a pair of resistors 78 and 80, coupled in a series circuit, in parallel with series inductance 76. Both wiper arm 82, of potentiometer 74, and wire 84, coupled to the juncture of resistors 78 and 80, are connected to the input terminal 86 of operational amplifier 88, utilizing series coupling resistors 90 and 92 therefor.

Transformer 94 provides an alternating voltage of suitable magnitude to a conventional bridge rectifier denoted by block 96, whose output terminals 98 provide operating power for operational amplifier 88, controlled in magnitude by zener diode 100. Should diode 100 be eliminated from the circuit, the signal available at the output terminal 102 of operational amplifier 88, would vary in magnitude. This variation of output signal would make the present invention controllable by voltage variations experienced at the primary winding of transformer 94. Alternatively, selecting the voltage level available at terminals 98, would provide another means of control of the output voltage obtained at the output terminals 68 and 70. The method of obtaining such output voltage variations utilizes uni-junction transistor 104, disposed in a relaxation oscillator circuit employing charging capacitor 106 and charging resistor 108 and current limiting resistor 110 and load resistor 112 installed in the output terminal 114 of the transistor. Gate 116 is shown connected to diode 118 and current limiting resistor 120 to output terminal 102. Capacitors 122 and 124, and resistors 126 and 128 comprise a feedback path across input terminal 86 and output terminal 102 so as to improve the stability of amplifier 88.

Voltage variations, experienced at input terminal 86 due to output voltage and output current variations of the present invention, are amplified and translated into current pulses, occurring in primary winding 130 of pulse transformer, disposed in parallel with load resistor 112. Gates 132, of S.C.R.'s 34 and 36, are symetrically and simultaneously caused to gate the S.C.R.'s when secondary winding 134 is energized by a voltage pulse due to the discharge current emanating from capacitor 106 through primary winding 130. Resistors 136 limit the gate current, due to excessive voltage present at secondary winding 134, thereby protecting S.C.R.'s 34 and 36 from damage. Diodes 138 provide a clean unidirectional pulse at gates 132, overcoming the tendency of ringing of secondary winding 134.

One of the advantages of the present invention provide a regulated power supply capable of operating from A.C. mains over a wide range of voltage.

Another advantage of the present invention is a regulator circuit utilizing a minimum of component parts.

Still another advantage of the present invention is a regulator with a full wave bridge rectifier circuit, thereby minimizing the ripple level.

Yet another advantage of the present invention is a voltage regulator whose output voltage may be varied in accordance with a manual adjustment of a potentiometer.

A further advantage of the present invention is a voltage regulator which automatically detects current or voltage variations occurring at the output terminals due to load variations which automatically adjusts therefor.

A still further advantage of the present invention is a power supply which can produce a wide range of output currents and voltages utilizing a unitary regulator circuit for all ranges of use.

Thus there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. An electronic power supply comprising a full wave bridge rectifier having two adjacent legs thereof, utilizing a pair of silicone control rectifiers, said bridge rectifier having input and output terminals, a transformer having a pair of primary windings and a pair of secondary windings, first means to switch said primary windings in a series electrical circuit or a parallel circuit, second means to switch said secondary windings in a series electrical circuit or a parallel circuit independently operable of said first means, said secondary windings coupled to the input terminals of said bridge rectifier, a filter circuit including at least one series inductance and at least one shunt capacitance having input terminals and output terminals, said input terminals of said filter circuit coupled to said output terminals of said bridge rectifier, an amplifier, said amplifier having input terminals and output terminals, a voltage divider network, said voltage divider network coupled to said output terminals of said filter circuit, a pair of resistors, said pair of resistors coupled together in a series circuit in series with said input terminals of said filter circuit, said voltage divider network coupled to said input terminals of said amplifier, the juncture of said pair of resistors coupled to said input terminals of said amplifier, a uni-junction transistor, said uni-junction transistor having gate terminals and output terminals, said gate terminals of said uni-junction transistor coupled to said output terminals of said amplifier, a pulse transformer having a primary winding and a secondary winding, said primary winding of said pulse transformer coupled to said output terminals of said uni-junction transistor, said pair of silicone control rectifiers having gate terminals, said secondary of said pulse transformer coupled to said gate terminals.

2. The electronic power supply as claimed in claim 1 wherein said voltage divider is manually adjustable.

* * * * *